G. T. Dalton.
Faucet.
No. 90,343.  Patented May 25, 1869.
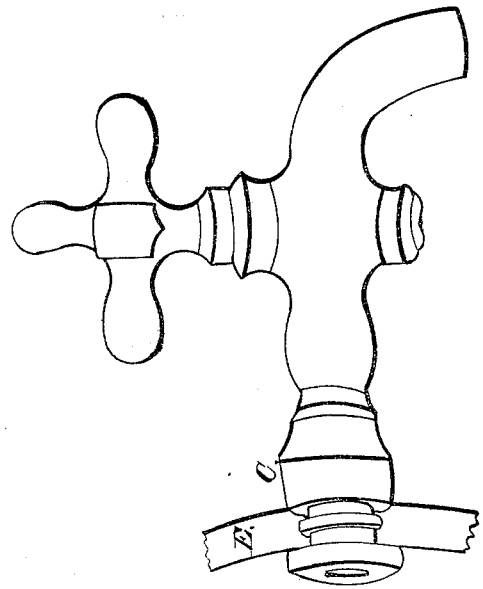
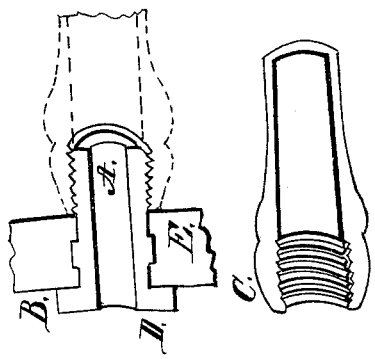
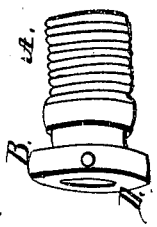
Witnesses.
Inventor.
Geo. T. Dalton.

GEORGE T. DALTON, OF NEW YORK, N. Y.

Letters Patent No. 90,343, dated May 25, 1869.

---

IMPROVEMENT IN FAUCETS.

---

The Schedule referred to in these Letters Patent and making part of the same.

---

Be it known that I, GEORGE T. DALTON, of the city of New York, in the county and State of New York, have invented a new and useful Apparatus for Attaching Faucets or Pipes to Vessels of every Kind, for the transmission of liquids, steam, or gas; and I do hereby declare that the following is a full, clear, and exact description of the construction and operation of the same, reference being had to the annexed drawings, making a part of this specification, in which—

Figure 1 is a perspective view.
Figure 2 is a longitudinal section.

To enable others skilled in the art to make and use the same, I will proceed to describe its construction and operation.

It consists of a tubular screw, A, fig. 1, a flange, B, and a flange or shoulder, C, formed or placed on the connecting-end of a faucet or pipe, on the inner surface of which is formed or cut a spiral groove or thread, to correspond and receive the tubular screw A, the surface D, of the flange B, to be formed or shaped to correspond with or fit the inner surface of the vessel to which it is to be attached, the periphery of this flange being perforated with one or more holes, to receive a small lever or wrench, for holding the tubular screw in position while being joined to a faucet or pipe on the outer side of the vessel, a section of which is shown at E.

The tubular screw A is passed from the inside of the vessel (through a convenient opening in its side, near the bottom,) to which it is to be attached, until the flange is in contact with the inner surface of the same, is held in position by a lever or wrench, as before mentioned, while the flange or shoulder C is turned or screwed on, until each flange or shoulder is brought in close contact with its respective surface of the vessel.

Claim.

What I claim as my invention, and desire to secure by Letters Patent, is—

The hollow plug A, provided with the flanged head B, and constructed so as to screw into the shoulder C, so as that a tight joint may be produced, by means of the said flanged head and shoulder, placed, the one on the inside, and the other on the outside of the vessel.

GEO. T. DALTON.

Witnesses:
W. A. GREENLEAF,
JAMES H. LANGLER.